United States Patent [19]
Chaney

[11] Patent Number: 5,841,433
[45] Date of Patent: Nov. 24, 1998

[54] DIGITAL TELEVISION SYSTEM CHANNEL GUIDE HAVING A LIMITED LIFETIME

[75] Inventor: John William Chaney, Noblesville, Ind.

[73] Assignee: Thomson Consumer Electronics, Inc., Indianapolis, Ind.

[21] Appl. No.: 799,901

[22] Filed: Feb. 13, 1997

Related U.S. Application Data

[63] Continuation of Ser. No. 572,132, Dec. 14, 1995, abandoned, which is a continuation of Ser. No. 363,263, Dec. 23, 1994, abandoned.

[51] Int. Cl.[6] .................................................. H04N 5/445
[52] U.S. Cl. ........................ 345/327; 348/563; 348/906
[58] Field of Search .................................. 345/327–552, 345/553, 563, 564, 369, 565, 569, 570, 906; H04N 5/495

[56] References Cited

U.S. PATENT DOCUMENTS

| | | | |
|---|---|---|---|
| 5,038,211 | 8/1991 | Hallenbeck | 348/906 X |
| 5,359,601 | 10/1994 | Wasilewski | 370/73 |

OTHER PUBLICATIONS

1993 NCTA Technical Papers, pp. 82–89, "Addressable Decoder with Downloadable Operation" by Mack Daily (Zenith Electronics Corp).

18th International Television Symposium and Technical Exhibition 1993, pp. 458–462, "Digital Broadcast Satellite System", by Robert Boyer (Thomson Consumer Electronics).

1993 NCTA Technical Papers, pp. 223–236, "Flexible Data Structures and Interface Rituals for Rapid Development of OSD Applications", by Caitlin Bestler (Zenith Cable Products, Div. of Zenith Electronics Corporation).

1993 NCTA Technical Papers, pp. 223–236, "Flexible Data Structures and Interface Rituals for Rapid Development of OSD Applications", by Caitlin Bestler (Zenith Cable Products, Div. of Zenith Electronics Corporation).

*Primary Examiner*—Nathan J. Flynn
*Attorney, Agent, or Firm*—Joseph S. Tripoli; Peter M. Emanuel; Robert D. Shedd

[57] ABSTRACT

A television system for receiving a plurality of digitally-encoded television programs includes circuitry for selecting a particular digital data transmission channel from a plurality of digital data transmission channels containing a desired digitally-encoded television program in response to a control signal, at least one of the data transmission channels also including television program schedule data. The system also includes user-operable data entry circuitry for entering data, and a controller for generating the above-noted control signal in response to user-entered data. The controller selects a virtual channel from a plurality of virtual channels in response to user-entered data, each virtual channel being subject to reassignment to a different one of said a plurality of digital data transmission channels, the television program schedule data defining the relationship of each of the television programs to respective ones of the plurality of digital data transmission channels.

6 Claims, 11 Drawing Sheets

| CH 150 | | | | | 7:35 PM |
|---|---|---|---|---|---|
| | | Program Guide | | | |
| | 7:30 PM | 8:00 PM | 8:30 PM | 9:00 PM | |
| HBO 102 | OTHER PEOPLE'S MONEY | | FREE PREVIEW | DREAM ON | |
| CBS 106 | EVENING NEWS | FRANNIE'S TURN | BROOKLYN BRIDGE | RAVEN | |
| WTTV 150 | MASH | IMMEDIATE FAMILY | | | |
| CINE 210 | EYEWITNESS | FUN CITY | | DOUBLE TROUBLE | |
| CNN 305 | PRIME NEWS | BOTH SIDES | RELIABLE SOURCES | WORLD NEWS | |
| USA 422 | COUNTER STRIKE | | QUANTUM LEAP | | |
| MORE | MOVIES | SPORTS | OTHER | ALL | EXIT |

FIG. 3

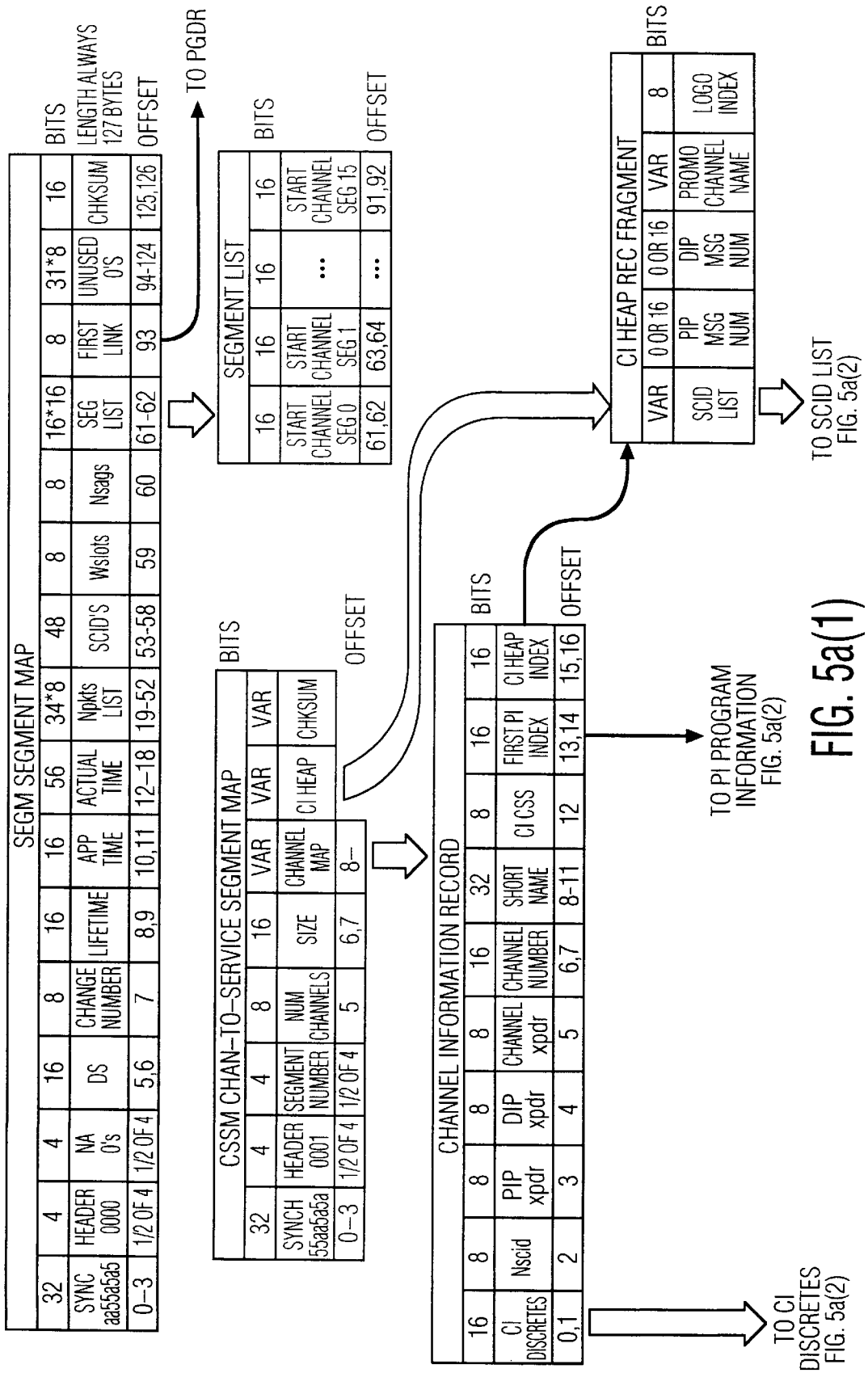
FIG. 5a(1)

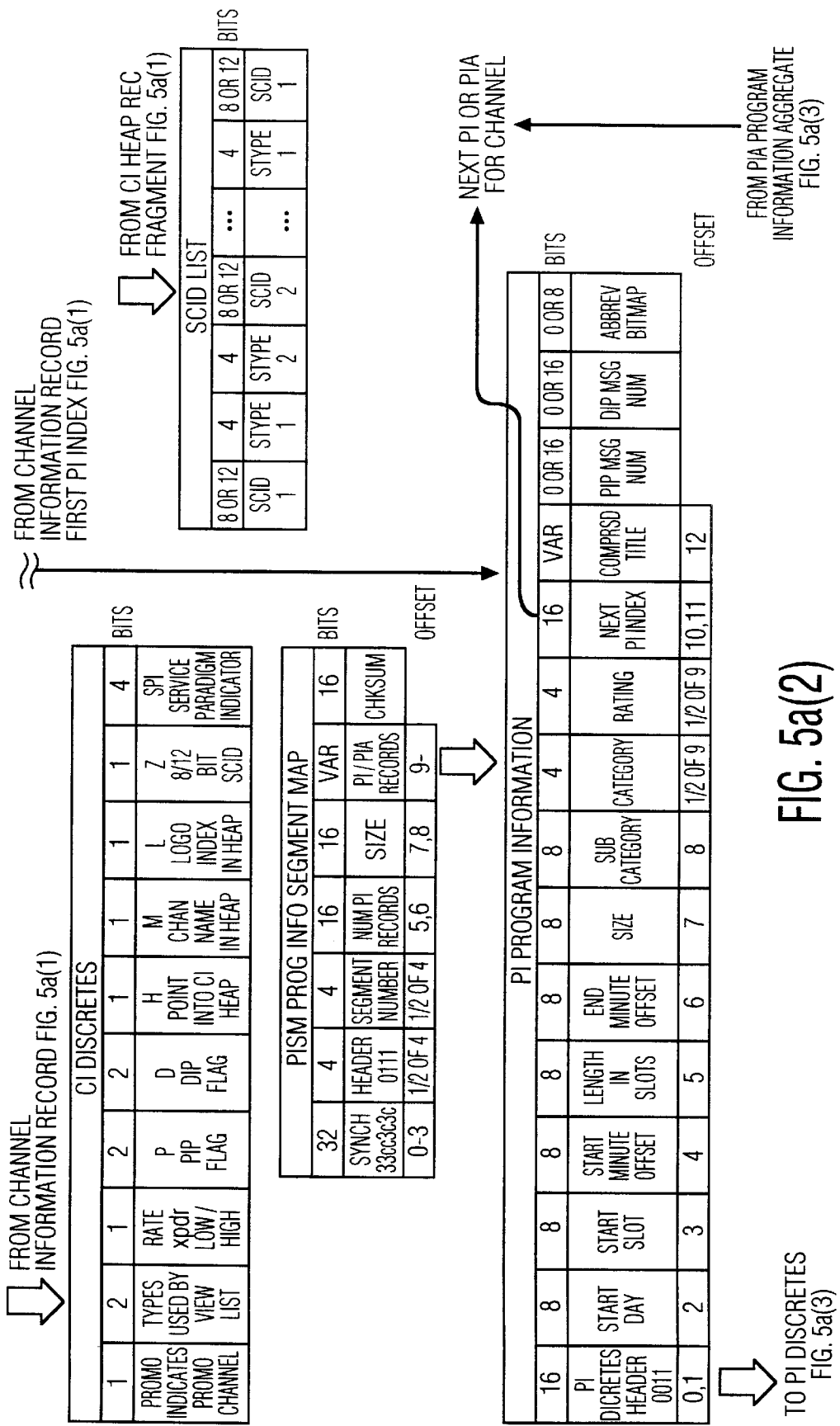
FIG. 5a(2)

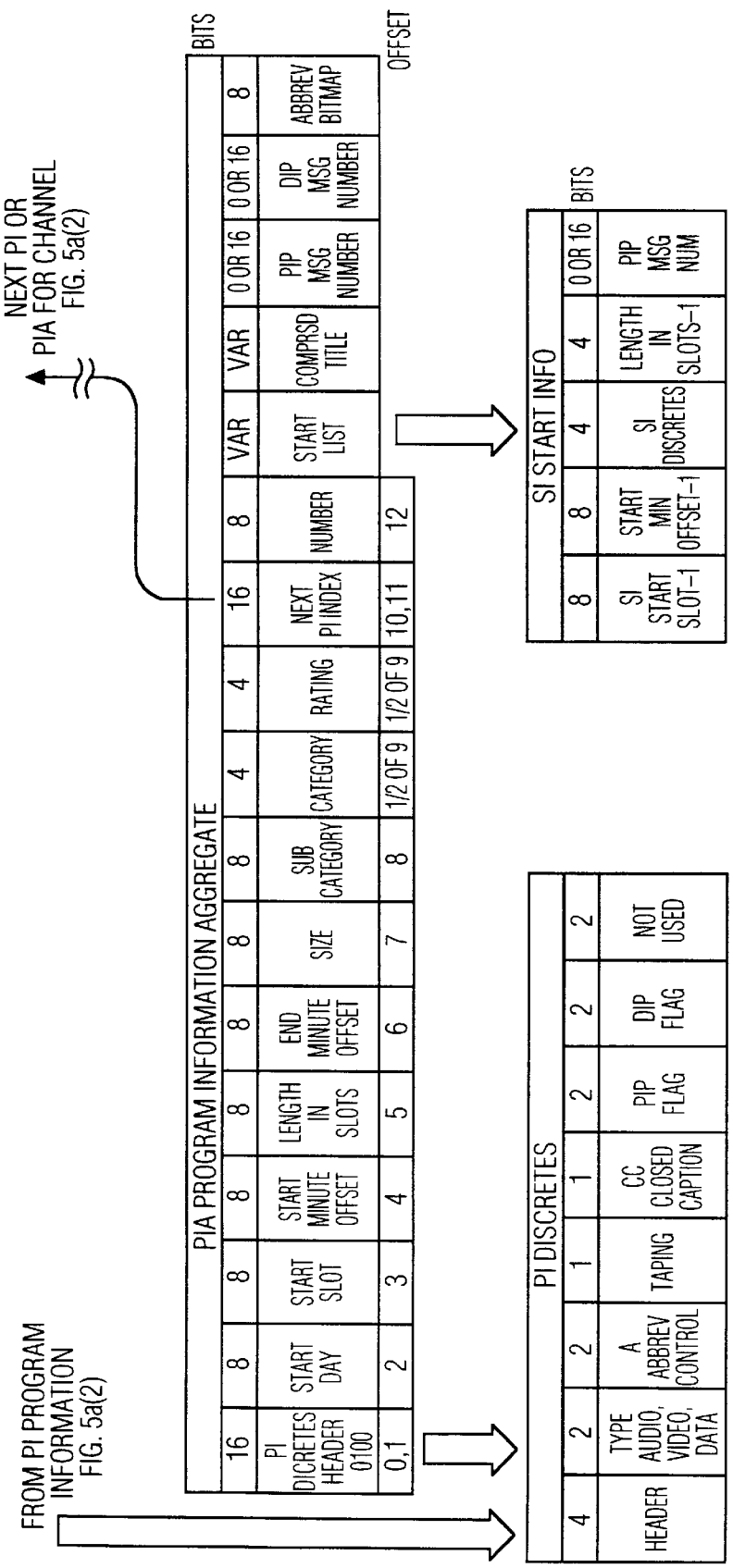
FIG. 5a(3)

DIGITAL TELEVISION SYSTEM CHANNEL GUIDE HAVING A LIMITED LIFETIME

This application is a continuation of application Ser. No. 08/572,132 filed on Dec. 14, 1995, now abandoned, which is a continuation of application Ser. No. 08/303,263, filed on Dec. 23, 1994, now abandoned.

FIELD OF THE INVENTION

This invention is related to the field of digital communications systems, and is described with reference to a digital satellite television system, but also may be applicable to such systems as a digital cable system, digital terrestrial broadcast system, or a digital communication system which utilizes telephone lines. The invention specifically concerns a method and apparatus for ensuring that the television schedule data, for generating screen displays for controlling the system, are current.

BACKGROUND OF THE INVENTION

In a satellite television communication system, the satellite receives a signal representing audio, video, or data information from an earth-based transmitter. The satellite amplifies and rebroadcasts this signal to a plurality of receivers, located at the homes of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence. The subject matter of the present invention is especially concerned with a downlink receiving unit designed for relatively easy use by the user.

The subject system is designed to utilize two satellites within a few degrees of each other in geosynchronous earth-orbit stationed at an altitude of 22,300 miles, approximately over the state of Texas. With this arrangement, receivers located anywhere in the contiguous 48 states of the United States can receive signals from both satellites on the same receiving antenna dish without having to reposition the antenna dish. Each satellite transmits its signals with a respective polarization. Selecting a satellite for reception of its signals is accomplished at the receiving antenna by selecting those signals with the appropriate polarization. Each satellite includes sixteen transponders for transmitting signals to the receiving antenna dish over a range of frequencies. Each transponder is time-multiplexed to convey a plurality of television channels (e.g., six to eight channels), substantially simultaneously. The satellite signals are transmitted in compressed and packetized form, and comprise television and ancillary data signals. Because the system is capable of carrying as many as two hundred fifty-six channels, some television program selection method and apparatus, which is easy to understand and operate, should be provided for the user.

If we look to conventional analog VHF and UHF broadcast television as a guide, we find that the solution provided therein is of little help, for the following reasons. The channel number of a given television station corresponds to a fixed band of frequencies. In other words, channel 6 in the United States is regulated to occupy the range from 82–88 MHz. Most non-technical consumers have no understanding of the frequency allocations of the television broadcast bands. Instead, they tune a desired channel by entering its channel number into their receiver. Their receiver is programmed with the proper information to perform the required tuning to the desired channel by generating the appropriate bandswitching and tuning commands, in response to the entering of the channel number by the user. It is possible for manufacturers to build a fixed channel number-to-frequency translation arrangement into each television receiver, only because the relationship between channel number and frequency band must conform to a broadcast standard.

In the United States, there is a terrestrial television schedule guide system known as Starsight® which provides a channel guide display for selecting television channels at fixed broadcast frequencies. Starsight® data is transmitted in the vertical interval of televisions programs of certain broadcasters (usually public broadcasting stations (PBS)), and displayed in the form of a schedule guide on the user's television screen. Unfortunately, three problems with the Starsight® system are perceived. First, it can take several hours for a Starsight® receiver to load its channel guide data due to its transmission at a low data rate. Thus, a viewer will not be able to use his Starsight® system to tune channels for at least several hours after installing it in his home. Second, the channel guide information is not transmitted on every channel, so updating the guide requires returning to the PBS channel, thereby interrupting the viewer's use of the receiver during the several hours it takes to reload the guide. Third, a Starsight® user must choose a several-hour window in time, which occurs once every twenty-four hours, for the Starsight® receiver to download a current copy of the channel guide. It is important to note that, unexpected changes in the television schedule cannot be detected by the Starsight® unit if the currently watched channel does not carry Starsight® signals, and most channels do not carry those signals. Thus, unexpected changes in the television schedule cannot be handled within a reasonable time due to, failure of the system to detect those changes, and the constraint of loading the schedule from a particular broadcast station during a predetermined time window.

SUMMARY OF THE INVENTION

A television system for receiving a plurality of digitally-encoded television programs includes an integrated receiver decoder (IRD) having circuitry for selecting a particular digital data transmission channel from a plurality of digital data transmission channels containing a desired digitally-encoded television program in response to a control signal, many of said data transmission channels also including television program schedule data. The system also includes user-operable data entry circuitry for entering data, and a controller for generating the above-noted control signal in response to user-entered data. The controller selects a virtual channel from a plurality of virtual channels in response to user-entered data, each virtual channel being subject to reassignment to a different one of said plurality of digital data transmission channels, the television program schedule data defining the relationship of each of the television programs to respective ones of the plurality of digital data transmission channels. The television schedule data being repeated several times per minute, and bearing a code indicative of its usable lifetime. The receiver acquires a new master program guide upon determining that its current channel guide has expired. In order to accommodate unexpected changes in schedule, every few minutes the receiver checks a status byte to see if the master program guide has changed. The exact number of minutes being predetermined to be several times less than the lifetime of the program guide. If the status byte indicates that the program guide has changed, then a new program guide is read in, without waiting for the current guide to expire. The status byte may be a version number for the master program guide, which is compared to the version number of the currently-stored master program guide.

BRIEF DESCRIPTION OF THE DRAWING

FIG. 3 is an illustration of a program guide screen display in accordance with the invention.

FIGURES 5a and 5b are illustrations of program data structures in accordance with the invention.

DETAILED DESCRIPTION OF THE DRAWING

Figure 1:
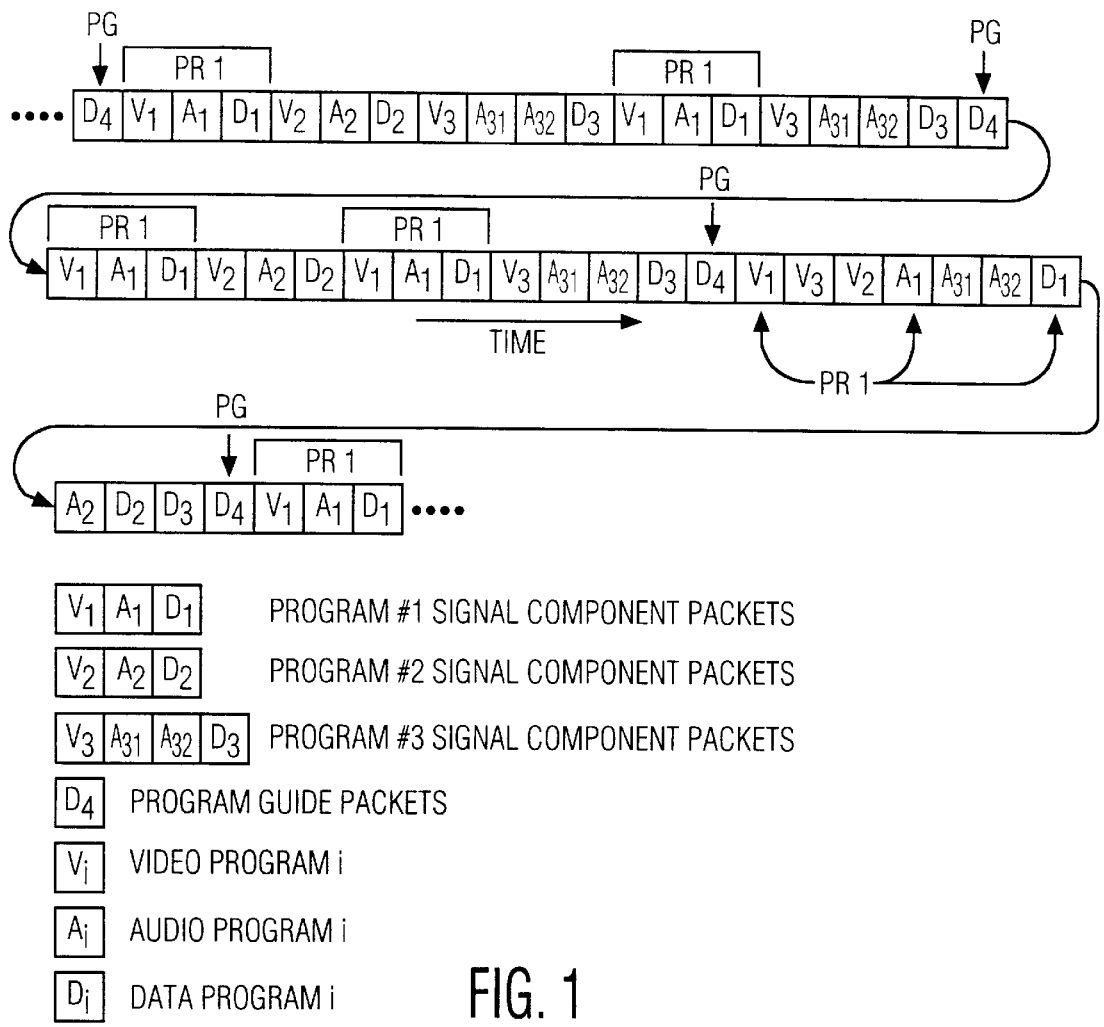
FIGS. 1 and 2 are illustrations of a typical transmitted data stream from a transponder in accordance with the invention.

In the subject system, the information necessary to select a given television program is not fixedly-programmed into each receiver but is rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by the particular transponder. In a system according to the subject invention, it is not possible to tune any channel until the first master program guide is received from the satellite, because the receiver literally does not know where any channel is located, in terms of frequency and position (i.e. data time slot) within the data stream of any transponder. Advantageously, the system is totally flexible in that any program may be assigned, or reassigned at any master program guide transmission time, to any transponder or data time slot, in a fashion which is completely transparent to the user, who sees only the unchanged program title and virtual channel.

The problem of changes in television schedule is overcome in that a master program guide preferrably is transmitted on all transponders with television program video, audio, and auxiliary data, and is repeated periodically, for example, every 2 seconds. However, a system in which only one or some of the transponders carries the master program guide is also envisioned, in that a fast tuner could be employed to switch to the transponder carrying the master program guide, or a second tuner could be tuned to receive the master program guide data. The data rate for transmitting a master program guide is approximately 100 kbits per second. The master program guide, once received, is maintained in a memory unit in the receiver, and updated periodically, for example every 30 minutes. Retention of the master program guide allows instantaneous television program selection because the necessary selection data are always available.

The master program guide has a lifetime (time within which its data is considered valid) of thirty minutes. A byte indicating the remaining lifetime of the master program guide is transmitted with every transmission of the guide itself (i.e., about every two seconds). In addition to the thirty minute lifetime of a master program guide, an "emergency guide" is available for providing a way to correct errors in the program guide, caused by operator error at the uplink site, or caused by a sporting event running "overtime" (i.e., beyond its scheduled time). A program guide status byte (i.e., the "change number" byte) is checked repeatedly at the end of every five minute interval to see if the content of the master program guide just received (but not yet stored) is changed from the content of the currently-stored master program guide. If so, then the newly-received master program guide is loaded into memory for immediate use. If not, the newly-received master program guide is discarded.

Following is an explanation of how such a system is implemented. As noted above, the system is capable of transmitting hundreds of programs. Each program may include a number of services. A service is defined herein as a program component, such as a video signal, an audio signal, a closed caption signal, or other data, including executable computer programs for an appropriate receiver. Each service of each program is identified by a unique Service Component Identifier (SCID). The information for the respective services is transmitted in packets of predetermined amounts of data (e.g., 130 bytes) and each packet includes an SCID corresponding to the service.

Figure 2:
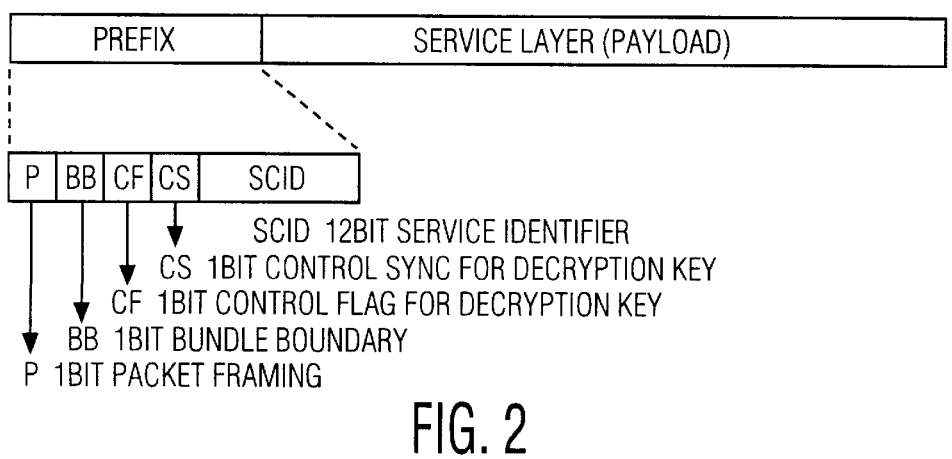

A representation of a typical data stream from one of the transponders is shown in FIG. 1, and a typical packet from that data stream is shown in FIG. 2. In FIG. 1, a string of boxes represents signal packets which are components of a plurality of different television programs transmitted by a given transponder. Packets with letters having like subscripts represent components of a single television program. For example, packet identified as $V_1$, $A_1$ and $D_1$, represent video, audio, and data for program 1. In the upper line of the string of packets, the respective components of a particular program are shown grouped together. However, it is not necessary to group components of a particular program together, as indicated by the packet sequence in the middle of the string. Moreover, there is no requirement to place the packets of a string in any particular order.

The string of packets shown in the lower portion of FIG. 1, represents three time multiplexed programs, programs 1, 2, and 3, plus packets representing a program guide (packets D4). It is important to note that the data of the program guide interrelates program components and virtual channels by virtue of the SCID. The respective packets are arranged to include a prefix and a payload as shown in FIG. 2. The prefix of this example includes two 8-bit bytes comprising five fields, four of which are 1-byte fields (P,BB,CF,CS), and one 12-bit field (SCID). The Payload portion contains the actual information to be received and processed. The exemplary prefix includes a 1-bit priority field (P); a 1-bit boundary field (BB), which indicates boundaries between significant signal changes; a 1-bit field (CF), which indicates whether or not the payload is scrambled; a 1-bit field (CS), which indicates which one of two descrambling keys is to be used to descramble a scrambled payload; and a 12-bit SCID. The remainder of the packet comprises the payload which may include error code parity bits appended to the end of the payload data.

A master program guide comprises packetized data formatted as defined above, and is assigned a specific SCID, such as, 0000 0000 0001. A master program guide comprises four sequential blocks of data, designated, SEGM, APGD, CSSM1 . . . CSSMnseg, and PISM1 . . . PISMnseg, to be described below.

Figure 4:
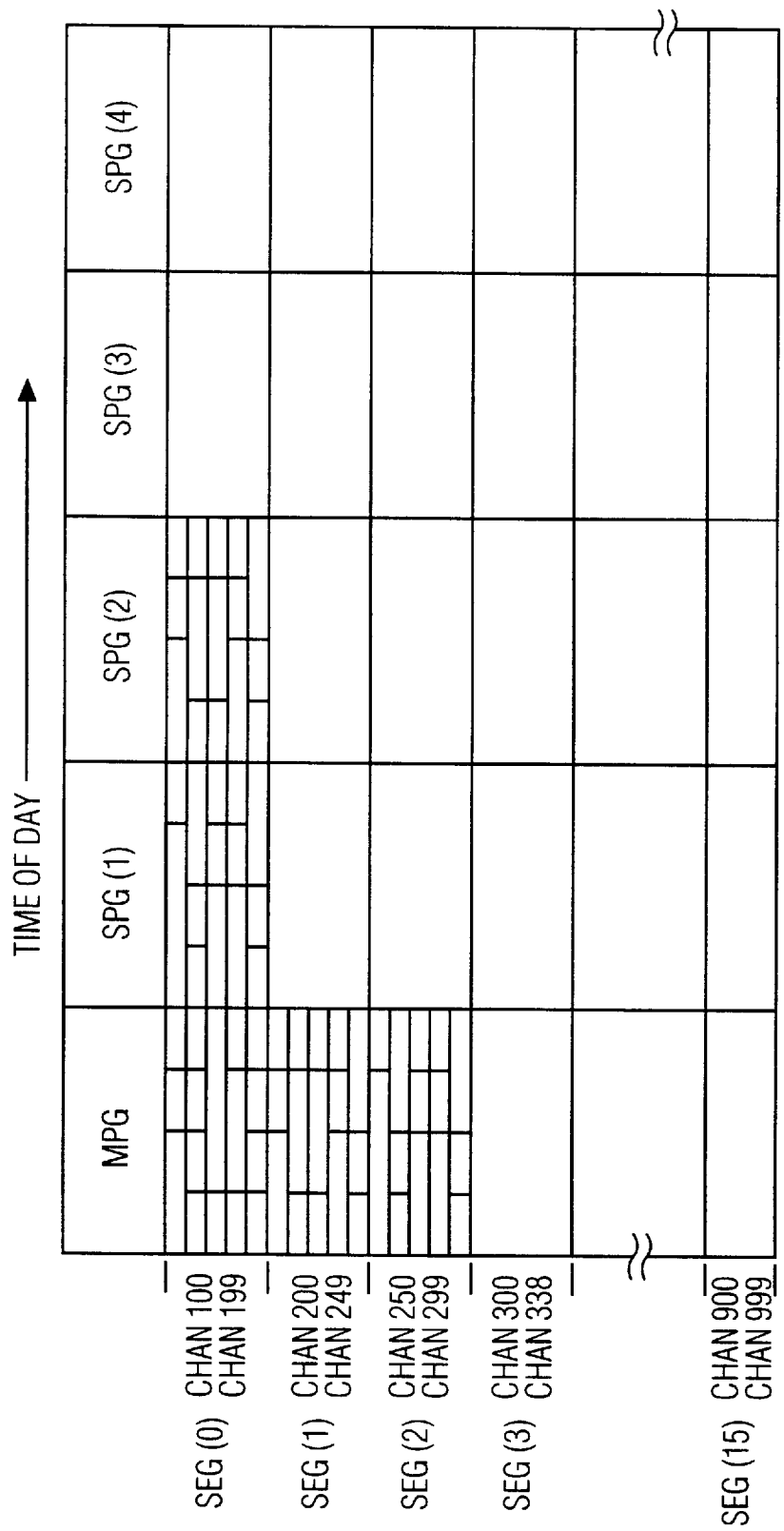
FIG. 4 is an illustration of segmentation of the master program guide and special program guides in accordance with the invention.

A master program guide typically includes television schedules for the next two hours, but may include schedules for four, six, or eight hours depending on the size of the memory allocated to store it in the receiver. In addition to the master program guide, there is also provided one or more special program guides (SPG), containing additional data, such as, for example, television program schedules for the following eight hours. That is, the master guide holds all information necessary for selecting current television programs, and the special guides contain information about future television programs. Special guides are downloaded from the satellite as needed and are not retained in memory due to their large size. As shown in FIG. 4, both the master program guide and special program guides are partitioned into a plurality of segments or portions (from 0 to 15) with an index "nseg" indicating the current number of segments comprising the special guide. Each segment carries program information for one or more virtual channels which range from 100 to 999. FIG. 4 shows only an exemplary allocation of virtual channels to segments, and other groupings can be, and are, made at the discretion of the operators at the satellite uplink center. Each special guide segment includes two sequential blocks of data, CSSM1 . . . CSSMnseg, and PISMI . . . PISMnseg, also to be described below.

Figure 5B:
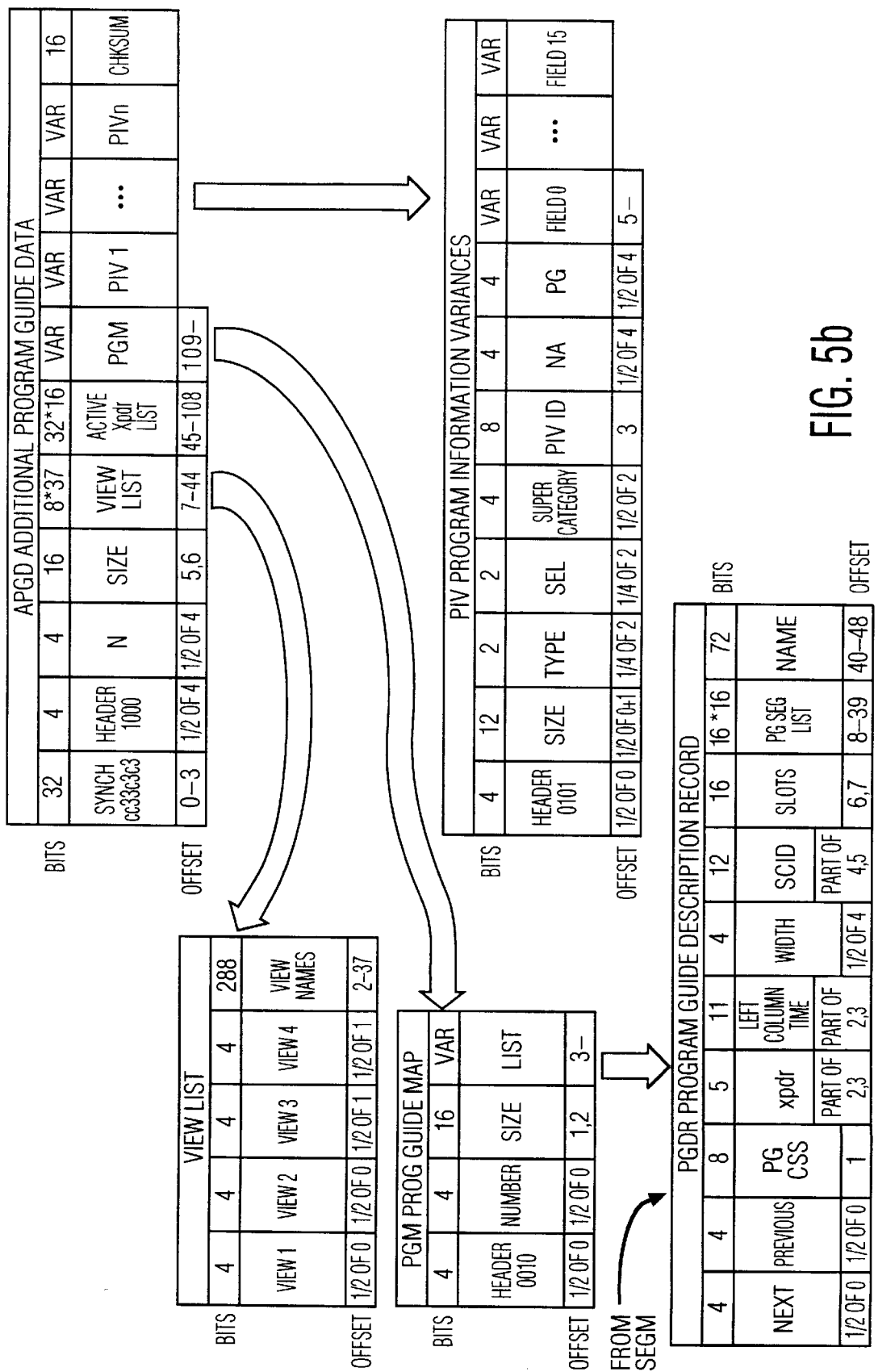

FIGURES 5a and 5b illustrate program data structures of the subject system, not all of which are relevant to the virtual channel selection and updating of the master program guide. Only those portion which are relevant will be discussed. Referring to FIGS. 5a and 5b, the Segment Map (SEGM) block of the master program guide contains information about the partitioning of the channel space into segments, and the number of segments. The Additional Program Guide Data (APGD) block contains a program guide map which indicates which special program guide segments are active, and their location (i.e., the particular transponder carrying the segment), as well as the SCIDs of the respective segments. The APGD block contains program information relating to ratings and theme of a particular television program. The APGD also includes a program guide map associating special guide segments with respective virtual channel names, virtual channel numbers, and content types.

The master guide and every special guide contain a Channel to Service Segment Map (CSSM) block and a Program Information Segment Map (PISM) block. The CSSM describes virtual channels by defining characteristics such as, channel name, call letters, channel number, and type, which are in the corresponding segment. The PISM block contains linked lists of program information such as, title, start time, duration, rating, and category, that are on each virtual channel described in the corresponding CSSM.

Relevant portions of the data structures shown in FIGS. 3, 4, 5a and 5b will be referred to in the following description of the program selection process. In order to understand the importance of maintaining an accurate master program guide, it may be helpful to describe how a master program guide is used to select a television program. Referring to FIG. 3, a user selects a television program for viewing, by moving a cursor (via operation of remote control up, down, right, and left, direction control keys) to a block of the program guide screen display which contains the name of the desired program.

The remote control unit is not shown for simplicity. When a SELECT key of the remote control is pressed, the current x and y position of the cursor is evaluated to derive virtual channel and program time information.

As shown in FIG. 4, and as noted above, the master program guide and special program guides are divided into segments (which may be as little as one segment or as many as 16). The lowest virtual channel (100) is always allocated as the first channel of seg (0). Each segment contains channel and program information for a defined number of virtual channels.

Upon deriving the virtual channel number from the X and Y cursor position information, the virtual channel number is used to point into the proper segment of the particular program guide (either master program guide, or a special program guide) to retrieve the specific channel information and program information. Specifically, the Channel Information (CI) Records in the CSSM (Channel to Service Segment Map) are a fixed length of seventeen bytes and contain such items as, the number of SCIDs in use (typically 2, audio and video), the channel transponder (Chan Xpndr) the channel number and short name (i.e., typically 4 characters), and a pointer into the linked program information. In order to access any specific Channel Information (CI) it is only required to repeatedly add 17 to a base value. Program information includes the start day and time of the program, the number of 30 minute slots it occupies, the theme category (i.e., drama, sports, comedy), and parental rating.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver, if the SCID of a particular packet does not match the SCID of the desired television program as listed in the program guide, then that data packet is discarded.

Referring again to the Segment Map (SEGM), of FIG. 5a, there are included in the SEGM two bytes of particular interest. The first is the lifetime byte which is initially set to thirty minutes when a new master program guide is first transmitted. Each transmission of that same master program guide will have the lifetime byte decremented by an amount equal to the time delay between transmissions of that guide (typically, every two seconds). When the lifetime byte reaches a value of zero (indicating that the currently stored master program guide is thirty minutes old), then a new master program guide is acquired and stored for immediate use. The second byte of particular interest is the "change number" byte. Each master program guide having content which is different from the content of the currently-stored master program guide will have a different number from the currently-stored master program guide. It is this byte which will be examined to determine whether an unscheduled change in programming has occurred (i.e., a change in television programming which occurred during the valid lifetime of the currently-stored master program guide). Detection of such an unexpected change requires the acquisition and storage of a new master program guide. At the end of every five minute interval (although another time period may be used) during the valid lifetime of the currently-stored master program guide, the "change number" byte of a newly received guide will be examined to determine if a change in master program guide content has occurred, and whether or not the newly-received master program guide should be stored and used, or discarded. The "change number" byte may be a version number for the master program guide, which is compared to the version number of the currently-stored master program guide. A flowchart illustrating the portion of the control program for the receiver which is relevant to the master program guide updating operation is shown in FIG. 9.

Figure 9:
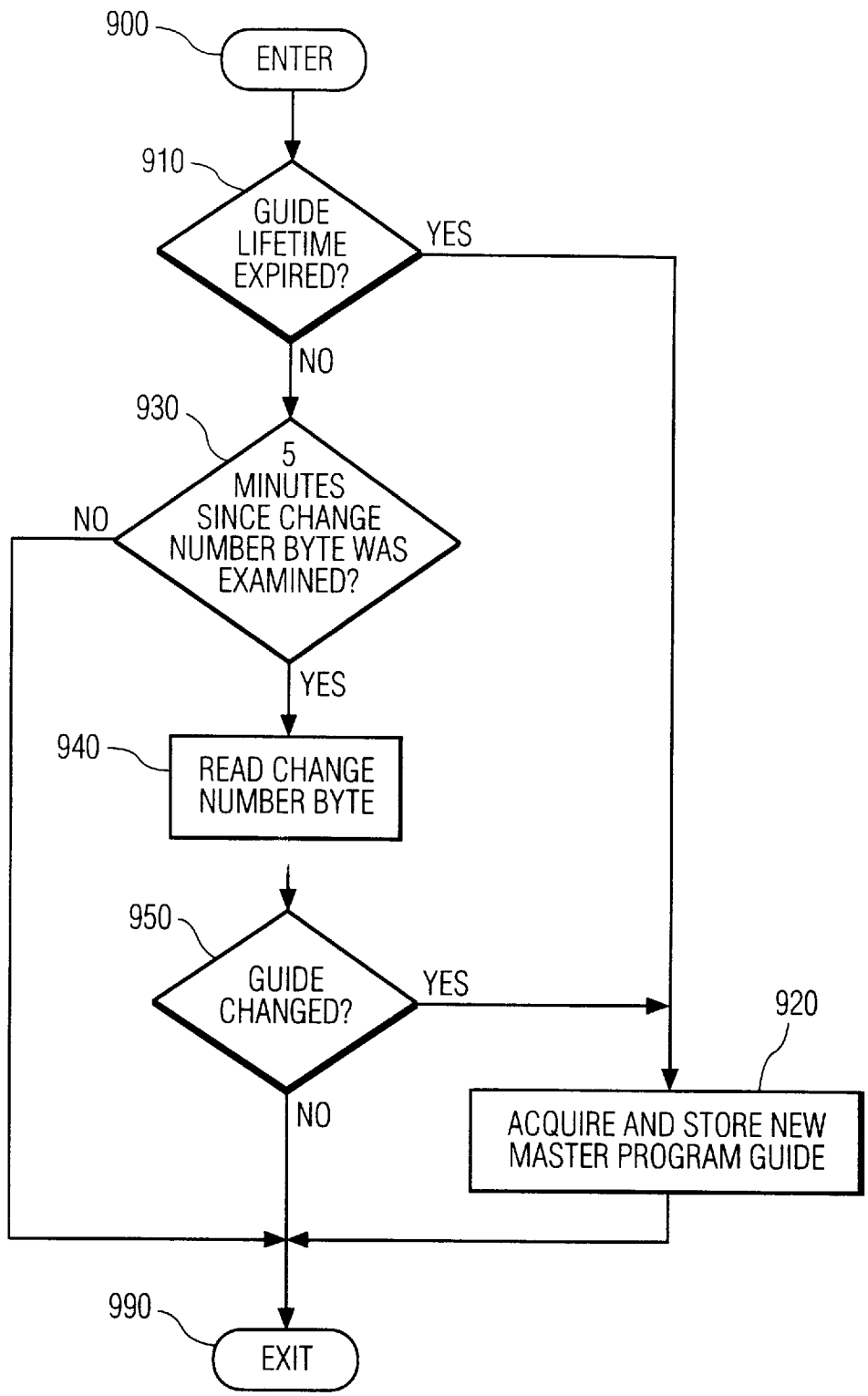
FIG. 9 is a flow chart showing a portion of the control program of the microcomputer of the IRD receiver unit.

The routine of FIG. 9 is entered at step 900 and proceeds to step 910 wherein a check is made to see if the lifetime of thirty minutes of the currently-stored master program guide has expired. If so, the program advances to step 920 to acquire and store a new master program guide, and then exits at step 990. If, at step 910, the lifetime of the currently-stored master program guide had not expired, then the NO path is taken to step 930 wherein a check is made to see if five minutes has elapsed since the last time that change number byte was examined. If the five minute period has not elapsed, then the routine is exited at step 990. If the five minute period has elapsed, then the change number byte is read at step 940. At step 950, a determination is made as to whether or not the newly received master program guide has been changed from the currently-stored master program guide. If so, the program advances to step 920 to acquire and store a new master program guide, and then exits at step 990. If not, then the NO path is taken to the exit at step 990. Thus, in the normal course of events, every thirty minutes the master program guide is updated with new information. However, in the event of an unexpected television program schedule change, the receiver will correct its master program guide within a five minute period, because a master program guide including schedule data for all active virtual channels is transmitted on every transmission channel every two seconds, and because a complete new master program guide takes only two seconds to load.

Figure 6:
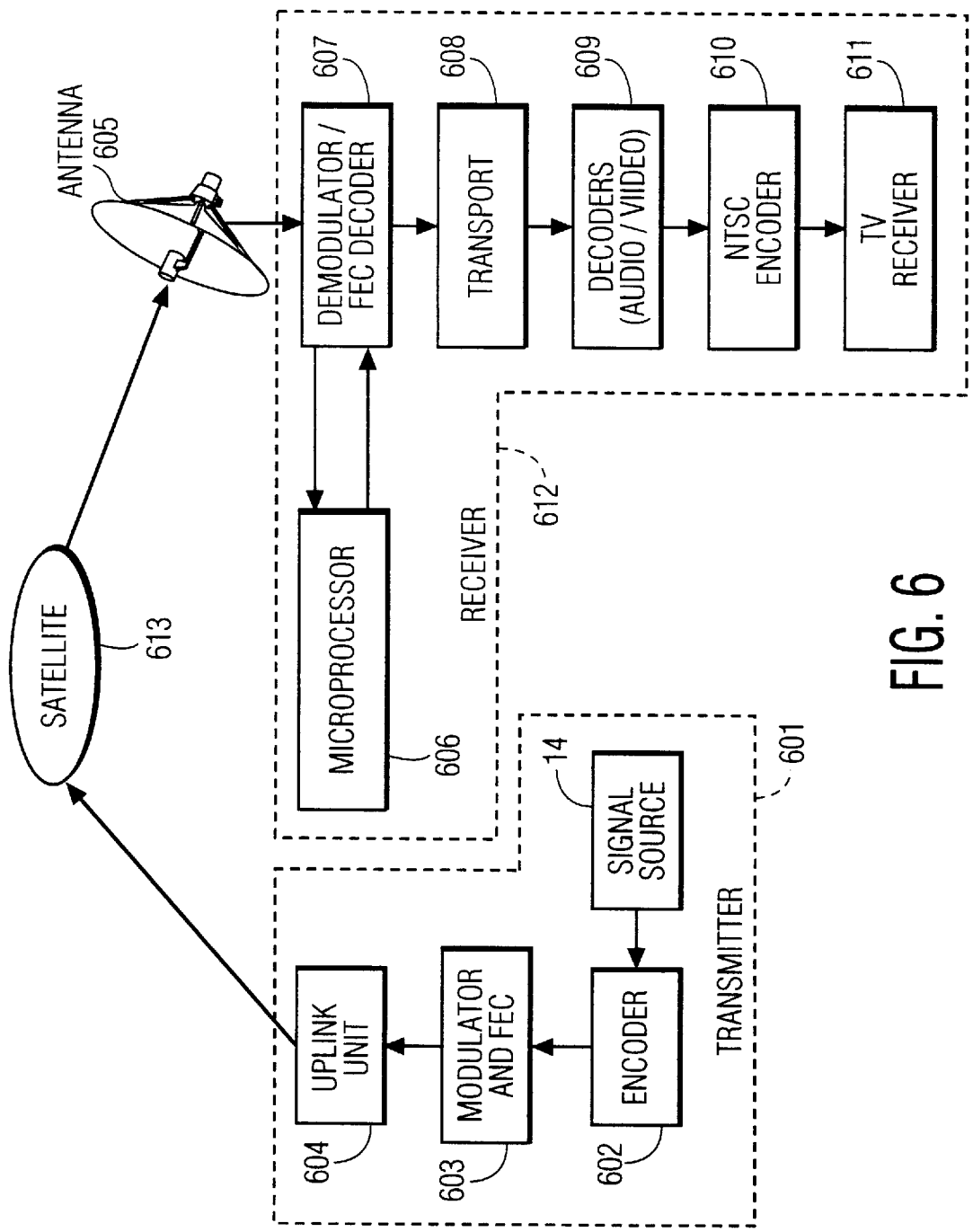
FIG. 6 is a block diagram of a satellite transmitting/receiving system according to the invention.

A brief description of system hardware, suitable for implementing the above-described invention, now follows. In FIG. 6, a transmitter 601 processes a data signal from a source 14 (e.g., a television signal source) and transmits it to a satellite 613 which receives and rebroadcasts the signal to a receiver 612. Transmitter 601 includes an encoder 602, a modulator/forward 30 error corrector (FEC) 603, and an uplink unit 604. Encoder 602 compresses and encodes signals from source 614 according to a predetermined standard such as MPEG. MPEG is an international standard developed by the Moving Picture Expert Group of the International Standards Organization for coded representation of moving pictures and associated audio stored on digital storage medium. An encoded signal from unit 602 is supplied to modulator/Forward Error Corrector (FEC) 603, which encodes the signal with error correction data, and Quaternary Phase Shift Key (QPSK) modulates the encoded signal onto a carrier. Both convolutional and Reed-Solomon (RS) block coding are performed in block 603.

Uplink unit 604 transmits the compressed and encoded signal to satellite 613, which broadcasts the signal to a selected geographic reception area. In this embodiment, satellite 613 operates in two modes, which trade off channel capacity for transmission power, or transmission power for channel capacity. In the first mode, satellite 613 illustratively transmits sixteen channels at 120 watts each. In the second mode, satellite 613 transmits eight channels at 240 watts each.

The signal from satellite 613 is received by an antenna dish 605 coupled to an input of a so-called set-top receiver 612 (i.e., an interface device situated atop a television receiver). Receiver 612 includes a demodulator/Forward Error Correction (FEC) decoder 607 to demodulate the signal and to decode the error correction data, a microprocessor 606, which operates interactively with demodulator/FEC unit 607, and a transport unit 608 to transport the signal to an appropriate decoder within unit 20 609 depending on the content of the signal, i.e., audio or video information. Transport unit 608 receives corrected data packets from unit 607 and checks the header of each packet to determine its routing. Decoders in unit 609 decode the signal and remove added transport data, if used. An NTSC Encoder 610 encodes the decoded signal to a format suitable for use by signal processing circuits in a standard NTSC consumer television receiver 611.

Figure 7:
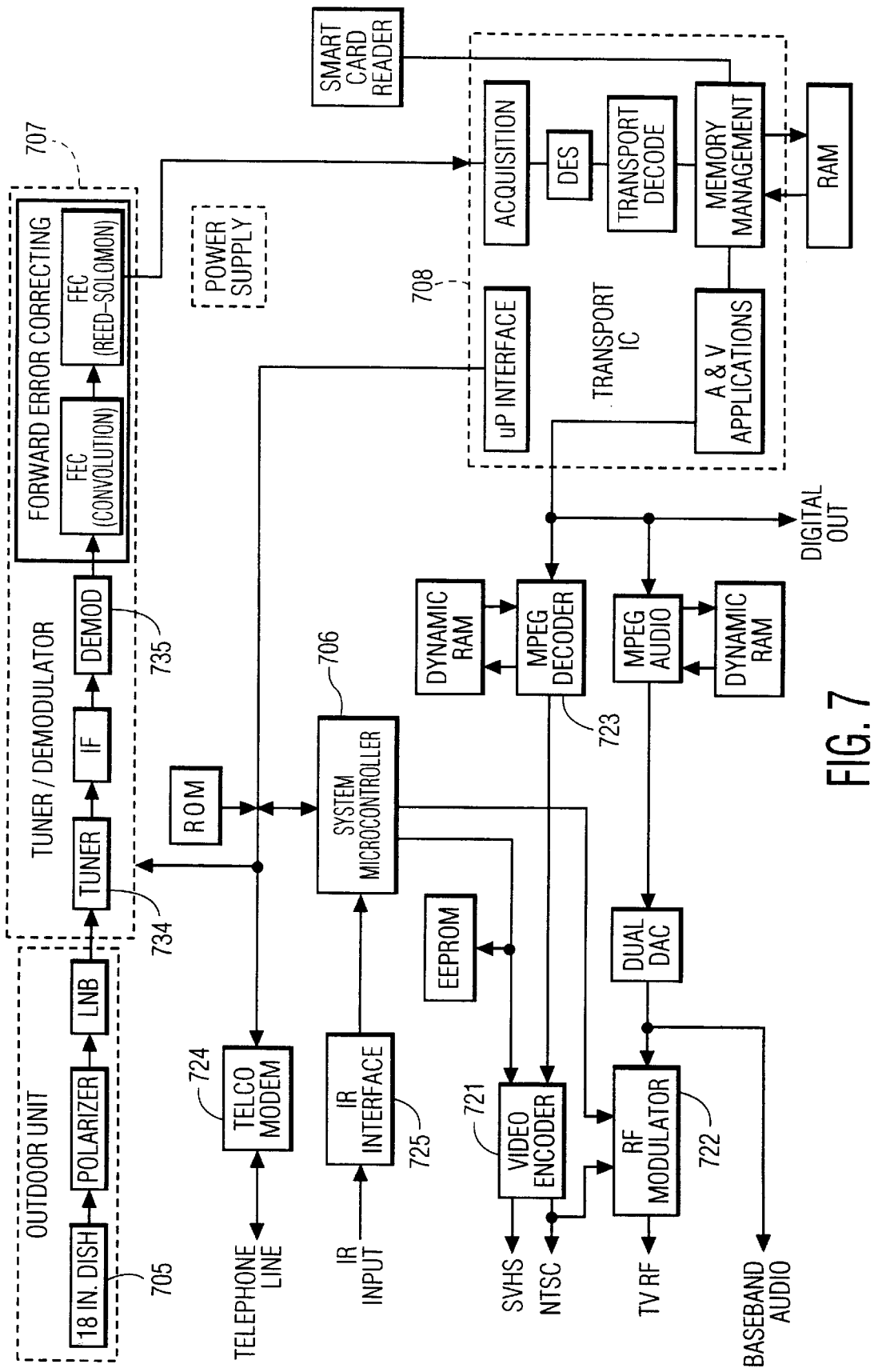
FIG. 7 is a block diagram of the IRD receiver unit.

FIG. 7 is a block diagram showing the components of the IRD receiver system including the outdoor antenna dish unit 705. The IRD includes a block 707 including a tuner 734 and a demodulator unit 735 for tuning various television signals. The IRD is under control of a microcontroller 706, which also controls the interfaces between the IRD and a telephone network via a telephone modem 724, between the IRD and a user via an IR link 725 and between the IRD and a television receiver via an MPEG decoder 723, a video encoder 721, and an RF modulator 722, and finally, between the IRD unit and a user via a smart card interface and transport IC 708. The master program guide is stored, for example, in RAM 709.

Figure 8:
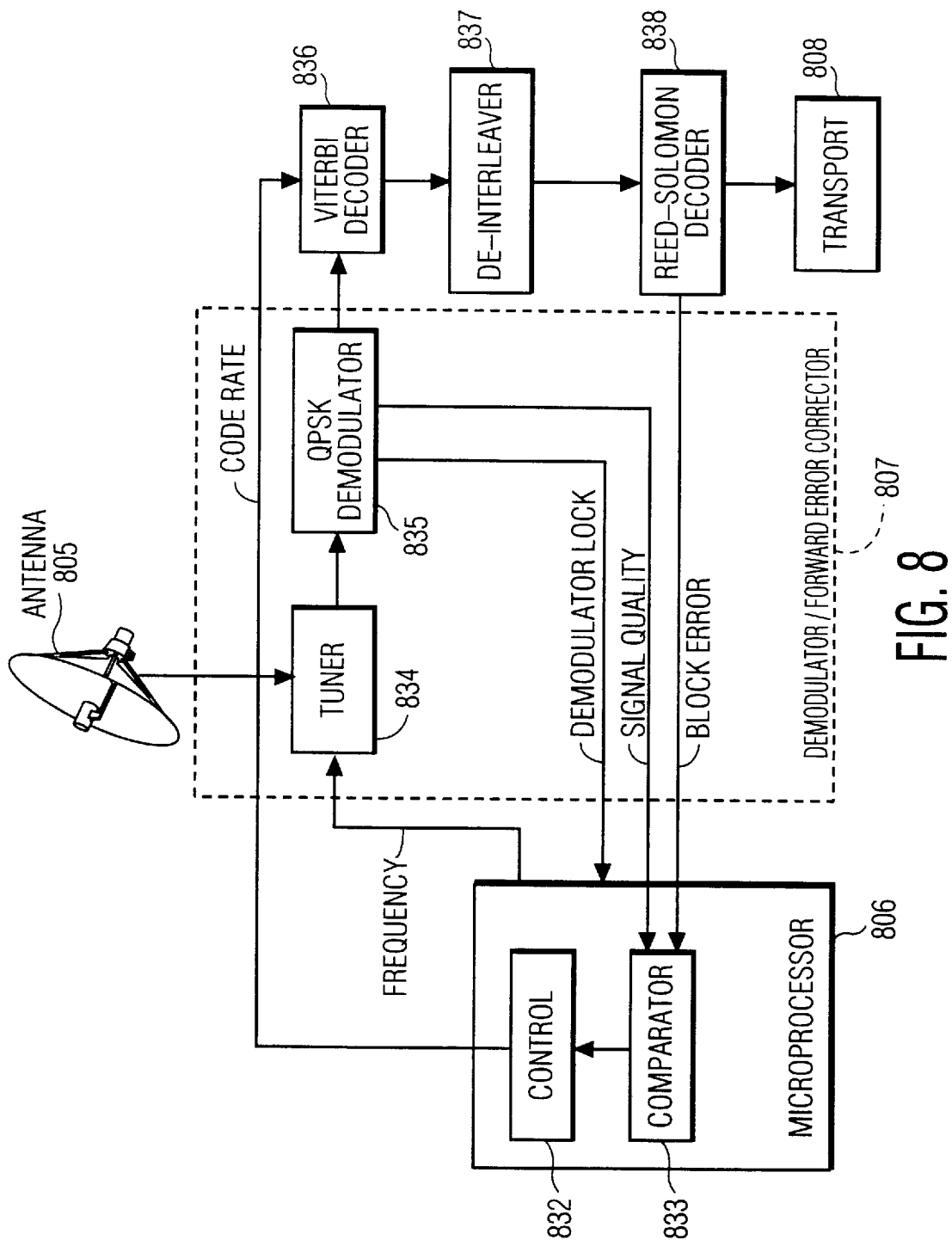
FIG. 8 is a block diagram of a portion of the IRD receiver unit of FIGS. 6 and 7, in detail.

Referring now to FIG. 8, demodulator/FEC unit 807 acquires, demodulates, and decodes the data signal which is received from antenna dish 805. This unit includes a tuner 834, a Quaternary Phase Shift Key (QPSK) demodulator 835, a Viterbi convolutional decoder 836, a de-interleaver 837, and a Reed-Solomon (RS) decoder 838, all of conventional design, arranged as shown.

Tuner 834 receives an input signal from antenna dish 805. Based upon a user's channel selection, a control unit 806 (i.e., a microprocessor) sends a frequency signal to tuner 834. This signal causes tuner 834 to tune to the appropriate channel and to downconvert the received signal in frequency in response to the tuning frequency signal sent to tuner 834 from microprocessor 806. An output signal from tuner 834 is provided to QPSK demodulator 835.

QPSK demodulator 835 locks onto (synchronizes with) the tuned channel, demodulates the modulated data signal, and generates a signal indicative of the quality of the demodulated signal. Demodulator 835 demodulates the modulated input data signal regardless of the error correction code rate of the received data signal. Phase-locked loop circuitry in demodulator 835 synchronizes the operation of demodulator 835 with the input signal using well-known techniques. Demodulator 835 generates a Demodulator Lock output control signal that indicates whether or not demodulator 835 is synchronized with the input signal, and supplies this signal to a storage register in microprocessor 806. an output demodulated data signal from unit 835 is provided to Viterbi decoder 836. Demodulator 835 also generates an output Signal Quality signal, which is indicative of the quality of the signal received from the satellite transmission, and is related to the signal-to-noise ratio of the received signal. Various sources of noise, as well as rain fade, may impair the quality of a received signal. A QPSK demodulator suitable for use as unit 835 is commercially available from Hughes Network Systems of Germantown, Md. (integrated circuit type No. 1016212), and from Comstream Corp.,. San Diego Calif. (No. CD2000).

Decoder 836 uses a Viterbi algorithm to decode and to correct bit errors in the demodulated signal from unit 835. Decoder 836 includes internal networks, as known, to synchronize its operation to the incoming demodulated signal in order to effectively decode the demodulated signal.

After decoder 836 decodes and error corrects the demodulated data signal, the decoded data signal is supplied to a de-interleaver 837. De-interleaver 837 restores the ordering of the data signal to its original sequence, and forms Reed-Solomon blocks (RS blocks), in accordance with known techniques. For this purpose de-interleaver 837 relies upon an 8-bit sync word inserted by the encoder at the beginning of each RS block, thereby providing RS block synchronization. The de-interleaved signal is supplied to a Reed-Solomon (RS) decoder 838.

RS decoder 838 decodes the RS blocks and corrects byte errors within a block. A decoded signal from Viterbi decoder 836 is provided to RS decoder 838 via de-interleaver 837. If decoder 836 uses the proper error correction decode rate to decode the data signal, de-interleaver 837 and Reed-Solomon decoder 838 will operate normally.

Thus, a digital multi-channel transmission system has been disclosed and described which allocates television programs to transponders and to time-multiplexed slots in the data stream of a given transponder in a way which is completely transparent to the user, who simply tunes a desired television program by selecting a virtual channel. Clearly, the key to smooth operation of this system is the transmission of the master and special channel guides which relate transponder channels and program data positions in the transponder data stream to virtual channel numbers. The subject invention ensures that the stored master program guide data are current by reloading it every half hour, and by checking every five minutes to see if the content of a newly-received master program guide differs from the content of the currently-stored master program guide.

What is claimed is:

1. A television system for receiving a plurality of digitally-encoded television programs wherein each of said digitally-encoded television programs is associated with at least one of a plurality of digital data transmission channels, each of said digital data transmission channels has the capacity to transmit at least one digitally-encoded television program and at least one of said plurality of digital data transmission channels includes television program schedule data, said system comprising:

means responsive to a control signal for selecting a particular digital data transmission channel from said plurality of digital data transmission channels; and control means coupled to said selecting means for generating said control signal;

said television program schedule data being updated at predetermined time intervals and comprising:

a first data structure defining the relationship of each of said television programs to respective ones of said plurality of digital data transmission channels, a second data structure indicative of a time period during which said defined relationships are valid, and a third data structure indicative of a change in said defined relationships;

said control means causing said first data structure of said television program schedule data to be acquired and stored when said second data structure indicates that said valid time period is less than a predetermined time period or when said third data structure indicates that said defined relationships have changed;

said control means examining said third data structure more often than said second data structure.

2. he television system of claim 1 wherein each of said digital data transmission channels includes said television program schedule data.

3. The television system of claim 1 wherein said time period of said second data structure is of the order of thirty minutes.

4. The television system of claim 1 wherein said third data structure comprises information indicative of a version of said television program schedule data.

5. A method for receiving a plurality of digitally-encoded television programs wherein each of said digitally-encoded television programs is associated with at least one of a plurality of digital data transmission channels, each of said digital data transmission channels has the capacity to transmit at least one digitally-encoded television program and at least one of said plurality of digital data transmission channels includes television program schedule data, said method comprising:

selecting a digital data transmission channel including television program schedule data from said plurality of digital data transmission channels, said television program schedule data being updated at predetermined time intervals and comprising:

a first data structure defining the relationship of each of said television programs to respective ones of said plurality of digital data transmission channels, a second data structure indicative of a time period during which said defined relationships are valid, and a third data structure indicative of a change in said defined relationships;

examining said second and third data structures of said television program schedule data of said selected digital data transmission channel, said third data structure being examined more frequently than said second data structure;

acquiring and storing said first data structure of said television program schedule data of said selected digital data transmission channel if said examination of said second data structure indicates that said valid time period is less than a predetermined time period or if said examination of said third data structure indicates that said defined relationships have changed.

6. The method of claim 5 wherein each of said digital data transmission channels includes said television program schedule data.

* * * * *